(12) United States Patent
Gomez

(10) Patent No.: US 8,692,517 B2
(45) Date of Patent: Apr. 8, 2014

(54) NON-DIFFUSION LIQUID ENERGY STORAGE DEVICE

(76) Inventor: Rodolfo Antonio M. Gomez, Brompton (AU)

( * ) Notice: Subject to any disclaimer, the term of this patent is extended or adjusted under 35 U.S.C. 154(b) by 353 days.

(21) Appl. No.: 13/265,579

(22) PCT Filed: Apr. 29, 2011

(86) PCT No.: PCT/AU2011/000494
§ 371 (c)(1),
(2), (4) Date: Oct. 21, 2011

(87) PCT Pub. No.: WO2011/134018
PCT Pub. Date: Nov. 3, 2011

(65) Prior Publication Data
US 2012/0133323 A1   May 31, 2012

(30) Foreign Application Priority Data

Apr. 30, 2010 (AU) .............................. 2010901836

(51) Int. Cl.
*H02J 7/00* (2006.01)
*H01M 4/36* (2006.01)
*H01M 4/48* (2010.01)
*H01M 6/20* (2006.01)

(52) U.S. Cl.
USPC .......................................... 320/128; 429/105

(58) Field of Classification Search
USPC .......................................... 320/128; 429/105
See application file for complete search history.

(56) References Cited

U.S. PATENT DOCUMENTS

| | | | |
|---|---|---|---|
| 4,784,924 A | 11/1988 | Savinell et al. | |
| 4,786,567 A | 11/1988 | Skyllas-Kazacos et al. | |
| 5,882,502 A | 3/1999 | Gomez | |
| 6,475,661 B1 * | 11/2002 | Pellegri et al. | 429/105 |
| 7,182,851 B2 | 2/2007 | Gomez | |
| 7,326,329 B2 | 2/2008 | Gomez | |
| 7,560,189 B2 * | 7/2009 | Clarke et al. | 429/105 |
| 7,625,663 B2 * | 12/2009 | Clarke et al. | 429/105 |
| 7,820,321 B2 * | 10/2010 | Horne et al. | 429/149 |
| 7,927,731 B2 * | 4/2011 | Sahu | 429/101 |
| 8,287,702 B2 * | 10/2012 | Gomez | 204/272 |
| 8,357,270 B2 * | 1/2013 | Gilliam et al. | 204/263 |
| 2010/0003545 A1 | 1/2010 | Horne et al. | |

FOREIGN PATENT DOCUMENTS

| | | |
|---|---|---|
| AU | 2004237840 | 12/2005 |
| WO | 03019714 | 3/2003 |
| WO | 2009018598 | 2/2009 |

* cited by examiner

*Primary Examiner* — Edward Tso
*Assistant Examiner* — Ramy Ramadan
(74) *Attorney, Agent, or Firm* — Klauber & Jackson LLC

(57) ABSTRACT

Disclosed herein is an efficient and high capacity electrical energy storage device consisting of diaphragm-less anode and cathode cells charging and discharging an electrolyte containing suitable ions that store electrical energy during the charging cycle and release the electrical energy during the discharge cycle. The charge-discharge reactions are reversible so that the efficiency does not reduce with the number of cycles and efficiency is maintained until the last of the charged electrolyte passes through the cells.

19 Claims, 13 Drawing Sheets

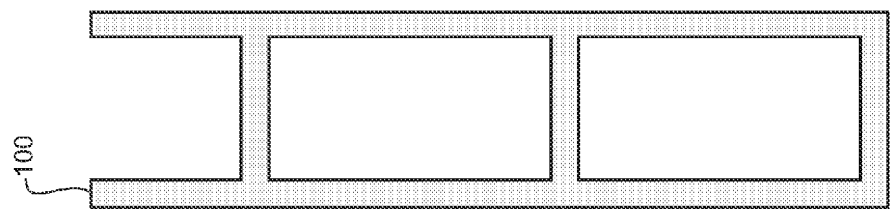
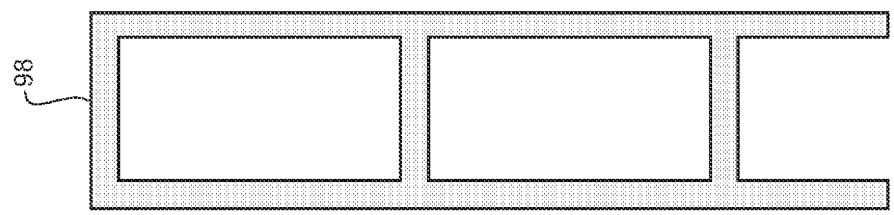
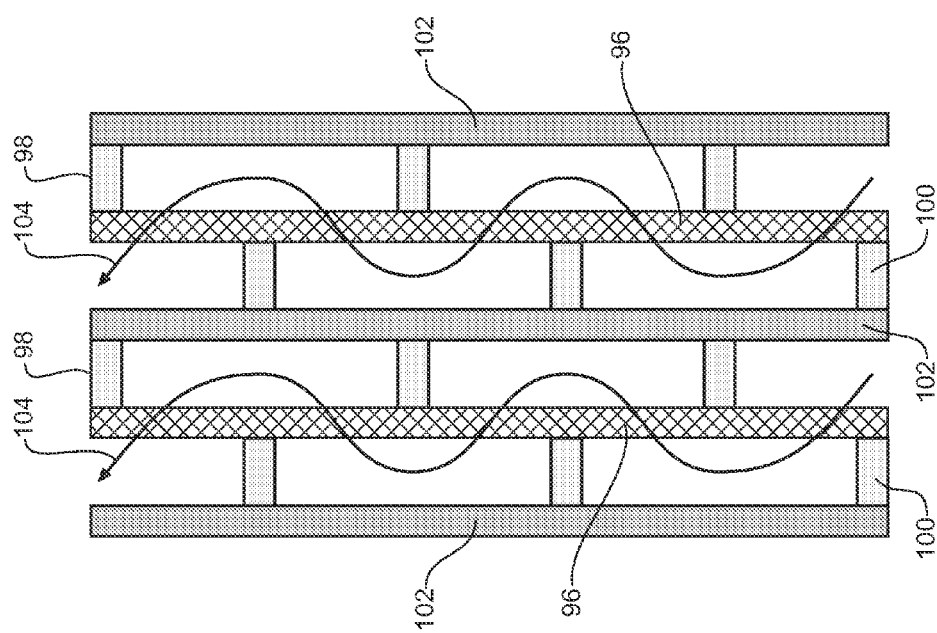
*Figure 4a*
*Figure 4b*

NON-DIFFUSION LIQUID ENERGY STORAGE DEVICE

CROSS REFERENCE TO RELATED APPLICATIONS

The present application is a National Stage Application claiming the priority of co-pending PCT Application No. PCT/AU2011/000494 filed Apr. 29, 2011, which in turn, claims priority from Australian application No. 2010901836, filed Apr. 30, 2010. Applicant claims the benefits of 35 U.S.C. §120 as to the PCT application and priority under 35 U.S.C. §119 as to the said Australian application, and the entire disclosures of both applications are incorporated herein by reference in their entireties.

This patent application claims priority from Australian Provisional Patent Application No. 2010901836 titled "Non-diffusion liquid battery" and filed 30 Apr. 2010, the entire contents of which are hereby incorporated by reference.

FIELD

The present invention relates to electrical energy storage and, in particular, to electrical energy storage devices in which electrical energy is stored in ions in a liquid electrolyte.

BACKGROUND

Rechargeable batteries (or storage batteries) are used in a variety of applications, such as in vehicles, tools, personal consumer devices, uninterruptible power supplies, etc. One emerging application for these batteries is in grid energy storage applications such as load leveling, where the batteries store electric energy for use during peak load periods, and in renewable energy uses, where the batteries store power generated from photovoltaic arrays during the day to be used at night.

A typical rechargeable battery includes an electrode assembly, which includes positive and negative electrode plates, a separator and an electrolyte. A problem with typical rechargeable batteries is that the reactions in these batteries are not completely reversible so that the charge-discharge efficiency of the battery reduces as the battery goes through many cycles. Furthermore, the charge-discharge efficiency of these batteries reduces markedly when the battery is below 90% State of Charge or SOC. On tests for photovoltaic application of lead acid batteries by the Sandia National Laboratories of Albuquerque, N. Mex., battery charging efficiency can be lower than 50% if charging is below the 90% SOC.

In more recent time, attempts have been made to produce liquid batteries where the energy is stored in the electrolyte and where the charge-discharge reactions are completely reversible. For example, U.S. Pat. No. 4,786,567 discloses a liquid battery in which the sulfuric acid electrolyte on the positive electrode contains vanadium ions $V(5+)/V(4+)$ and the sulfuric acid electrolyte on the negative side contains the vanadium ions $V(3+)/V(2+)$. The positive and negative electrodes are separated by an ionic membrane. A further development of this technology is disclosed in PCT patent application no. WO 03/019714 which discloses a redox battery where the electrolyte on the positive electrode contains a mixture of halides in hydrochloric acid while the hydrochloric acid electrolyte in the negative electrode consists of vanadium ion $V(3+)/V(2+)$. Again, the positive and negative electrodes are separated by an ionic membrane.

Unfortunately, the use of a membrane or diaphragm in these liquid batteries creates high impedance resulting in lower energy efficiency and also lower capacity for the battery because of the slow diffusion process when a diaphragm or membrane is interposed between the positive and negative electrodes. As a result, the power capacity of the battery is reduced and a larger battery is required for a given power capacity. Furthermore, there may be some diffusion of ions through the membrane between the positive and negative electrolytes which may result in the electrolytes being contaminated.

There is a need for an electrical energy storage device or battery that overcomes or at least ameliorates at least one of the problems associated with prior art storage devices or batteries.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in any country before the priority date of each claim of this application.

SUMMARY

The present invention arises from our research into liquid energy storage systems that do not have a membrane or diaphragm disposed between the positive and negative electrodes. The absence of a diaphragm means there is no diffusion process involved to reduce efficiency and capacity of the electrical energy storage device.

Thus, in a first aspect, the present invention provides an electrical energy storage device comprising an anode cell and a cathode cell, the anode cell comprising an anode electrode and an anode solution electrode and the cathode cell comprising a cathode electrode and a cathode solution electrode, an electrical connection between the anode electrode and the cathode electrode, the electrical connection comprising a DC power source connection and an electrical load connection, a direct electrical connection between the anode solution electrode and the cathode solution electrode, the anode cell containing an anodic reversible redox couple electrolyte comprising ions capable of being oxidised in the anode cell during a charging cycle to form higher oxidation state ions which are capable of being reduced in the anode cell during a discharge cycle, and the cathode cell containing a cathodic reversible redox couple electrolyte comprising ions capable of being reduced in the cathode cell during a charging cycle to form lower oxidation state ions which are capable of being oxidized in the cathode cell during a discharge cycle.

The anode solution electrode and the cathode solution electrode are in contact with the anodic reversible redox couple electrolyte and the cathodic reversible redox couple electrolyte, respectively, to provide electronic connection between the anode cell and the cathode cell.

The device may comprise an anodic redox couple electrolyte supply comprising a charge reservoir and a storage reservoir, each reservoir being in fluid communication with the anode cell, and a cathodic redox couple electrolyte supply to the cathode cell, the cathodic redox couple electrolyte supply comprising a charge reservoir and a storage reservoir, each reservoir being in fluid communication with the cathode cell.

The anode and cathode electrodes may be connected to a DC power source and an electrical load with necessary switches.

In some embodiments, the anodic reversible redox couple electrolyte is a polyhalide-halide redox couple.

The cathodic reversible redox couple electrolyte may be an inorganic acid containing ions selected from iron, vanadium, cerium, chromium and similar metal ions that do not undergo phase change during the charging and discharging cycle. In some embodiments, the cathodic reversible redox couple electrolyte is a V(II)-V(III) redox couple. The cathodic reversible redox couple electrolyte may be dissolved in a supporting electrolyte. The supporting electrolyte may be an aqueous solution containing an inorganic acid.

In a second aspect, the present invention provides a process for producing electricity, the process comprising applying an electrical load to the electrical load connection of the electrical energy storage device according to the present invention, wherein the charge reservoir of the anodic redox couple electrolyte supply contains anodic reversible redox couple electrolyte ions in the higher oxidation state, and the charge reservoir of the cathodic redox couple electrolyte supply contains cathodic reversible redox couple electrolyte ions in the lower oxidation state.

In a third aspect, the present invention provides an electrical storage system comprising an electricity generator in electrical connection with an electrical energy storage device according to the present invention.

In some embodiments, the electricity generator may be a renewable electric energy source such as a solar, wind, wave, hydro or geothermal energy source. In these embodiments, the electrical energy storage device may be used to store excess power for cyclic energy sources and releasing the power when required.

In some embodiments, the electricity generator may be thermal, nuclear, hydro, geothermal or solar energy source and the electrical energy storage device may be used to store off-peak power and release it during peak power demands.

In some embodiments, the electrical energy storage device is applied to electric vehicles to provide the electric power for the vehicle.

In a fourth aspect, the present invention provides a process for storing electrical energy generated during an off-peak period for use during a peak period, the process comprising charging an electrical energy storage device according to the present invention using the power generated during the off-peak period, and discharging the stored electrical energy during a peak period.

In a fifth aspect, the present invention provides a process for storing electrical energy generated by a cyclical energy source for use during a period when the energy source produces little or no electrical energy, the process comprising charging an electrical energy storage device according to the present invention using the power generated by the cyclical energy source, and discharging the stored electrical energy during period when the energy source produces little or no electrical energy.

BRIEF DESCRIPTION OF THE FIGURES

In the drawings:

FIG. 4 shows details of the electrode construction of an embodiment of the invention;

DESCRIPTION OF EMBODIMENTS

It is to be understood that the following description is for the purpose of describing particular embodiments only and is not intended to be limiting with respect to the above description.

Figure 1:
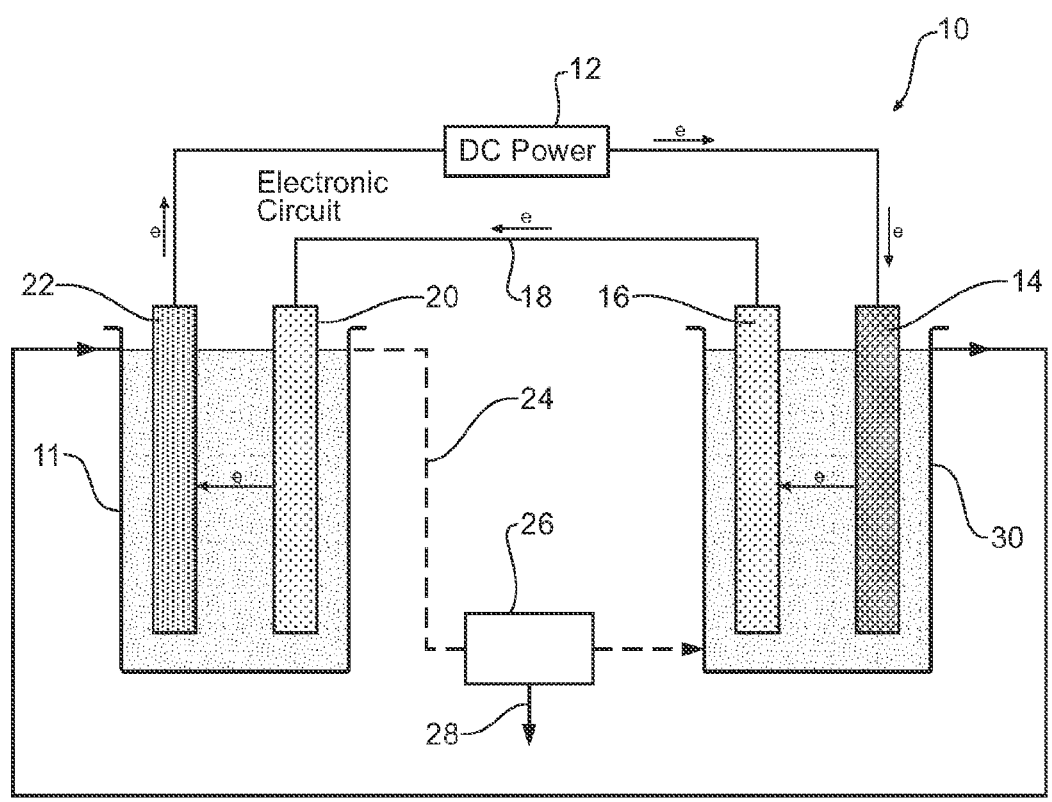
FIG. 1 shows a prior art diaphragm-less electrolytic cell as disclosed in U.S. Pat. No. 5,882,502 and Australian patent 707701.

The present inventor has previously developed an electrolytic system that functions without a diaphragm or membrane between the anode electrode and the cathode electrode (U.S. Pat. No. 5,882,502 and Australian Patent No. 707701). This electrolytic system allows electrolytic processes such as metal extraction, the production of hydrogen and oxygen from water (U.S. Pat. No. 7,326,329), the electrolysis of coal to produce hydrogen (U.S. Pat. No. 7,182,851) to proceed in a commercial scale. FIG. 1 shows a diaphragm-less electrolytic cell 10 as disclosed in U.S. Pat. No. 5,882,502 and Australian Patent No. 707701. DC power supply 12 delivers electric current to the cathode electrode 14 that proceeds to the cathode solution electrode 16 and then through the external conductor 18 and to the anode solution electrode 20 then to the anode electrode 22 and then back to the DC power supply 12 to complete the electrical circuit. Copper is oxidised at the anode electrode 22 and the copper ions produced are carried by the electrolyte 24 to solution purification 26 with impurities 28 rejected while the purified solution is delivered to the cathode cell 30 where the copper ions are reduced to copper metal at the cathode electrode 14 to complete the ionic circuit.

The present invention relates to the application of the diaphragm-less electrolytic system to the storage of electrical energy from cyclic renewable energy such as solar, wind and wave electrical energy and in the storage of electrical energy to be used for peaking supply in existing thermal, nuclear and hydroelectric power plants.

Figure 2:
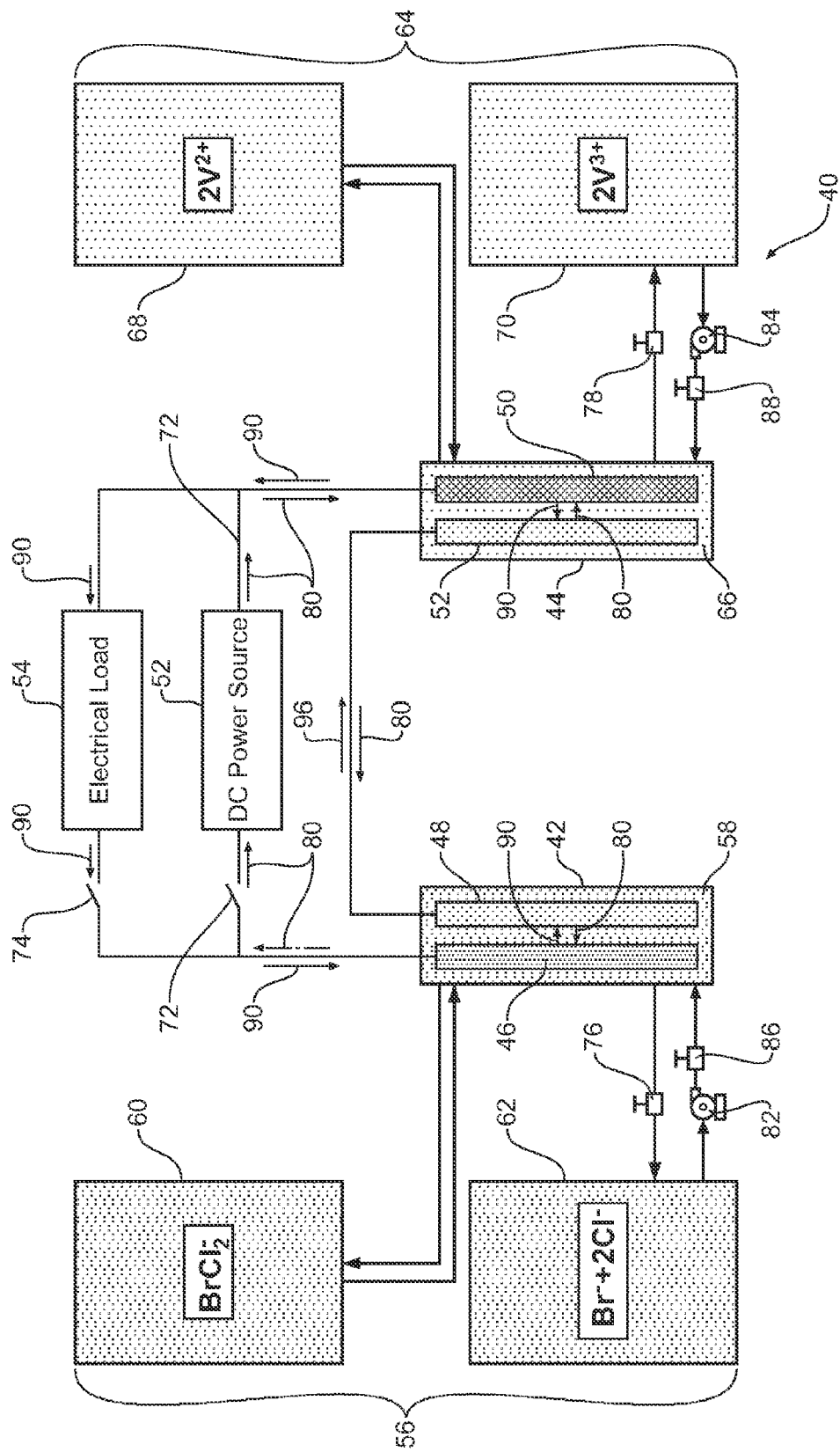
FIG. 2 shows an embodiment of a non-diffusion liquid electric storage system according to the present invention.

FIG. 2 shows an embodiment of an electrical energy storage device 40 according to the present invention. The device 40 comprises an anode cell 42 and a cathode cell 44. The anode cell 42 comprises an anode electrode 46 and an anode solution electrode 48. The cathode cell 44 comprises a cathode electrode 50 and a cathode solution electrode 52. There is an electrical connection between the anode electrode 46 and the cathode electrode 50. The electrical connection comprises a DC power source connection to which a DC power source 52 is connected and an electrical load connection to which an electrical load 54 is connected. There is also a direct electrical connection between the anode solution electrode 48 and the cathode solution electrode 52. The anode cell 42 contains an anodic reversible redox couple electrolyte 58 comprising ions capable of being oxidised in the anode cell during a charging cycle to form higher oxidation state ions which are capable of being reduced in the anode cell during a discharge cycle. The cathode cell 44 contains a cathodic reversible redox couple electrolyte 66 comprising ions capable of being reduced in the cathode cell during a charging cycle to form lower oxidation state ions which are capable of being oxidized in the cathode cell during a discharge cycle.

An anodic redox couple electrolyte supply 56 supplies the anodic reversible redox couple electrolyte 58 to the anode cell 42. The anodic electrolyte supply 56 comprises a charge reservoir 60 and a storage reservoir 62, each reservoir being in fluid communication with the anode cell 42. A cathodic redox couple electrolyte supply 64 supplies the cathodic reversible redox couple electrolyte 66 to the cathode cell 44. The cathodic electrolyte supply 64 comprises a charge reservoir 68 and a storage reservoir 70, each reservoir being in fluid communication with the cathode cell 44.

The anodic reversible redox couple electrolyte 58 may be a bromine-chlorine couple in a hydrochloric acid solution. The cathodic reversible redox couple electrolyte 66 may be a vanadium II/vanadium III couple.

At the beginning of the charge cycle, both storage reservoirs 62 and 70 are full of electrolyte while both charge reservoirs 60 and 68 are empty. At the start of the charging cycle, DC power supply source 52 is turned on and connected by switch 72 to the anode 46 and cathode 50 electrodes while electrical load 54 is disconnected at switch 74 and valves 76 and 78 are closed. The anodic redox couple electrolyte 56 is pumped through the anode cell 42 where the Br(−) 2Cl(−) is oxidized to BrCl2(−) and the charged electrolyte is delivered to storage reservoir 62. The cathodic redox couple electrolyte 66 containing the V(3+) is pumped through the cathode cell 44 where electrons are removed at the cathode from the V(2+) ions resulting in the formation of V(3+) which is transferred to the storage reservoir 70. Sensors may be installed to detect when the electrolytes are fully charged. The current flow during the charge cycle is shown by arrows 80. The applied current may be pulsed during charging to reduce resistance and energy used.

At the start of the discharge cycle, pumps 82 and 84 are stopped, valves 86 and 88 are closed and valves 76 and 78 are open. As the negatively charged electrolyte flows through the anode cell 42 and the positively charged electrolyte flows through the cathode cell 44, due to the potential between the anode 46 and cathode 50 electrodes, the BrCl2(−) is oxidised to form Br(−) 2Cl(−) at the anode electrode 46 while the V(3+) is reduced to form V(2+) at the cathode electrode 50. In the discharge mode, the anode electrode is performing a reducing function while the cathode electrode is performing an oxidizing function. The discharging function continues until either the electrical load is no longer there or the charge reservoirs 60 and 68 are empty. Suitable controls may be provided so that the flow of the electrolytes through the anode cell 42 and cathode cell 44 matches the demand for power of the electrical load 54. The current flow during the discharge cycle is indicated by the arrows 90.

The reactions during the charge cycle are:

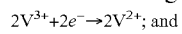
$2V^{3+} + 2e^- \rightarrow 2V^{2+}$; and

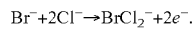
$Br^- + 2Cl^- \rightarrow BrCl_2^- + 2e^-$.

The reactions during the discharge cycle are:

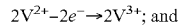
$2V^{2+} - 2e^- \rightarrow 2V^{3+}$; and

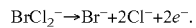
$BrCl_2^- \rightarrow Br^- + 2Cl^- + 2e^-$.

FIG. 2 shows two anode reservoirs 60,62 and two cathode reservoirs 68,70 but the system would operate also with one divided reservoir each for the anode and the cathode.

It will be seen that the present invention also provides a process for producing electricity, the process comprising applying an electrical load to the electrical load connection of the electrical energy storage device of the present invention, wherein the charge reservoir of the anodic redox couple electrolyte supply contains anodic reversible redox couple electrolyte ions in the higher oxidation state, and the charge reservoir of the cathodic redox couple electrolyte supply contains cathodic reversible redox couple electrolyte ions in the lower oxidation state.

The positive and the negative electrolytes are generally made from an inorganic acid/water mixture such as sulfuric, hydrochloric, or nitric acid and contain ions that are reversible in valencies. The positive and negative electrolytes are completely separate from each other.

The catalyst ions in the positive and negative electrolytes may be suitable metals or other inorganic or organic compounds that can be oxidized or reduced reversibly. Some examples of metals or compound catalyst ions are shown in Table 1.

TABLE 1

| | |
|---|---|
| $Eu^{2+} \rightarrow Eu^{3+} + e^-$ | $E_0 = 0.43$ |
| $Cr^{2+} \rightarrow Cr^{3+} + e^-$ | $E_0 = 0.41$ |
| $Ti^{2+} \rightarrow Ti^{3+} + e^-$ | $E_0 = \sim 0.37$ |
| $V^{2+} \rightarrow V^{3+} + e^-$ | $E_0 = 0.255$ |
| $Sn^{2+} \rightarrow Sn^{3+} + e^-$ | $E_0 = -0.15$ |
| $Cu^+ \rightarrow Cu^{2+} + e^-$ | $E_0 = -0.153$ |
| $Fe(CN)_6^{4-} \rightarrow Fe(CN)_6^{3-} + e^-$ | $E_0 = -0.36$ |
| $MnO_4^{2-} \rightarrow MnO_4^- + e^-$ | $E_0 = -0.546$ |
| $Fe^{2+} \rightarrow Fe^{3+} + e^-$ | $E_0 = -0.771$ |
| $Hg_2^{2+} \rightarrow 2Hg^{2+} + 2e^-$ | $E_0 = -0.920$ |
| $Pu^{3+} \rightarrow Pu^{4+} + e^-$ | $E_0 = -0.97$ |
| $2Br^- \rightarrow Br_2 + e^-$ | $E_0 = -1.0652$ |
| $Tl^+ \rightarrow Tl^{3+} + 2e^-$ | $E_0 = -1.25$ |
| $2Cl^- \rightarrow Cl_2 + 2e^-$ | $E_0 = -1.3595$ |
| $Br^- + 2Cl^- \rightarrow BrCl_2^- + 2e^-$ | $E_0 = -1.41$ |
| $Ce^{3+} \rightarrow Ce^{4+} + e^-$ | $E_0 = -1.61$ |

The voltages are standard voltages referred to the hydrogen electrode. The actual voltage produced depends on factors such as the concentration of the active ions and temperature and these operating voltages can be determined experimentally. The electrolytes may contain modifying or stabilizing agents such as boric acid. The reference voltage is the hydrogen electrode.

In some embodiments, the negative ions in the negative electrolyte are bromine and chlorine that form the bromine-chlorine couple or halex. It is important that there is no phase change such as from ions to metal or gas as this will reduce the reversibility of the charging and discharging reactions. The ions chosen much also be reasonably available and at a reasonable price. There are more choices with the ions in the positive electrolyte. Aside from there being no phase change during the charging and discharging cycle, the metal ions that give a higher voltage during the charging and discharging cycle, and also more current, are favored. For example, in Table 1, mercury and thallium will be a better match with the bromine-chlorine halex. The toxicity of the metals must also be considered in the selection.

The positive or negative electrolyte may be acid or alkaline but is usually a mixture of an inorganic acid and water with the catalyst ions dissolved. The concentration of the catalyst ions may range up to near saturation in the electrolyte solution. The concentration of the inorganic acid in the electrolyte may range up to about 10.0M.

The anode, cathode and solution electrodes may be made of plates or felt or gauze like construction or expanded metal or a composite electrode consisting of a central current collector and gauze or felt connected to the central current collector. The material of the electrode may be a metal, a metal oxide or carbon. The surface of the electrode may be coated with a metal or a metal compound or may be speckled with tiny particles of metal or metal oxide to suppress the formation of hydrogen or oxygen or other gases from the surface of the electrodes which reduces current efficiency. It is important to achieve as close to 100% current efficiency in this electrical energy storage device during its operation. The anode and cathode electrodes may be coated with metals and metal oxides to favor the charging and discharging reactions such as platinum and platinum group metals and oxides. Certain metals and their oxides may also be useful such as molybdenum, cobalt, nickel and the rare earth metals.

Figure 3:
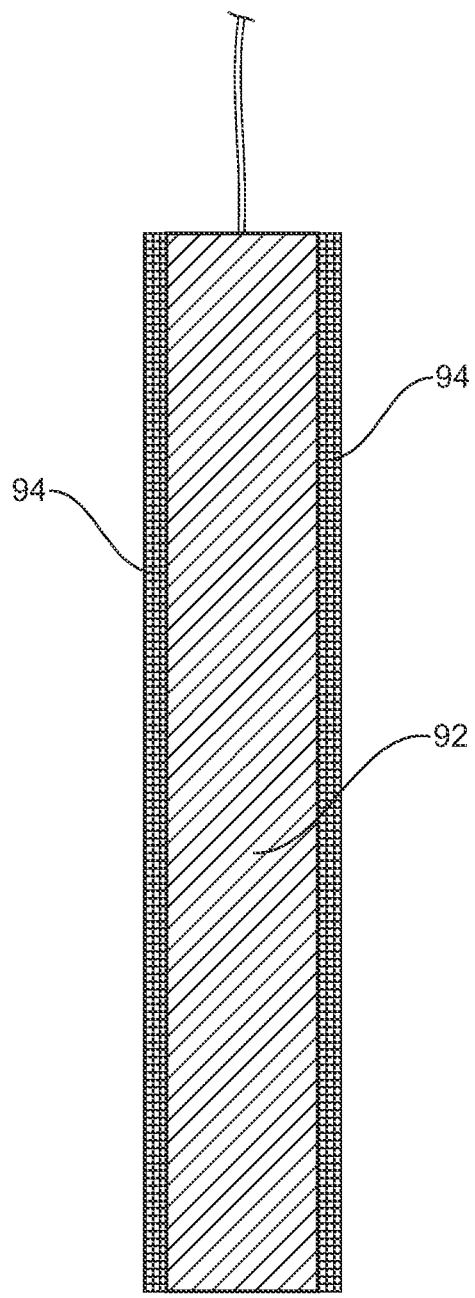
FIG. 3 shows details of anode or cathode electrodes and solution electrode immersed in electrolyte in a cell.

There may be more than one set of anode and cathode cells to allow a high production of power during the discharge cycle from the same amount of activated electrolyte.

Where the ionic reactions are reversible as in the anode and cathode of the electrical energy storage device, the reverse reaction to the desired reaction of the ions in the electrolyte must be prevented or minimised as this will reduce the electrical efficiency of the system. This may be done by including a non-conducting mesh over the surfaces of the solution electrodes. FIG. 3 shows a cross-section of a solution electrode 92 with a layer of non-electrical conducting mesh 94 installed on the electrode. The solution electrode 92 may be a plate or sheet that may or may not be coated with materials such as metals including platinum, nickel, cobalt, molybdenum or a mixture of such metals, or oxides of ruthenium, iridium, rhodium or palladium. Preferably, the solution electrode 92 should act only as a current carrier and not carry out any chemical reaction as this is not only undesirable but the current efficiency may be reduced. One method to prevent chemical reactions at the solution electrode 92 is to incorporate a non-conducting mesh 94 on the solution electrode 92 surface. The mesh may be made of any non-conducting material such as a suitable plastic. One suitable plastic is polypropylene. The mesh 94 provides a stagnant layer of electrolyte on the surface of the anode or cathode solution electrode. During charging, at the anode, this stagnant layer prevents the $BrCl_2$ ion from being in contact with the anode solution electrode and being converted back to bromine(−) and chlorine (−). During charging at the cathode, the stagnant layer of electrolyte prevents the vanadium (II) ions from contacting the cathode solution electrode and being converted to vanadium (III). The reverse is true during discharging. This plastic mesh ensures that the anode and cathode solution electrodes act only as current conductors and not act as electrodes producing reactions that would reduce the current efficiency of the cell.

Undesired reactions at the solution electrodes may also be prevented by coating the surface of the solution electrode with a suitable catalyst or material with a high over voltage for the undesired reaction. The coatings may be platinum, nickel, cobalt, molybdenum and rare earth metals or oxides of these metals including ruthenium and iridium. Nanoparticles such as nano titanium oxide particles may be added to the coating on the anode or cathode electrodes.

FIG. 4 shows a multiple of electrodes 96 in one cell fitted with baffles 98 and 100 to provide good contact between the electrolyte and the electrodes. The electrodes 96 may be made of expanded sheet metal of suitable material such as titanium metal or a metal alloy such as antimonial lead. This electrode construction provides efficient contact between the electrolyte and the anode and cathode electrodes 96. Solution electrodes 102 are made of a sheet or plate and between the solution electrode 102 and the anode or cathode electrode 96 are baffles 98 and 100 made of non-conductive material. The baffles are made of material such as plastic and are constructed as shown in FIG. 4 (b). The baffles 98 and 100 are installed between the solution electrodes 102 and the anode or cathode electrode 96. The electrolyte flowing through the cell is forced to weave in and out of the anode or cathode electrode 96 as shown by arrows 104. This efficient contact reduces problem with polarization that causes the cell voltage to rise, thereby increasing energy consumption.

The electrical energy storage device according to the present invention may be used in various applications, including:

Storing off-peak power in conventional power plants and releasing this energy during peak power demands;

Use as power source for electric cars and vehicles;

Use to store excess power for cyclic alternative energy source such as wind generated electric power; solar power; wave power; energy tower and others and releasing the power when required; and Use in a wide range of application for emergency power supply.

Some of these applications are shown in FIGS. 5 to 13.

Figure 5:
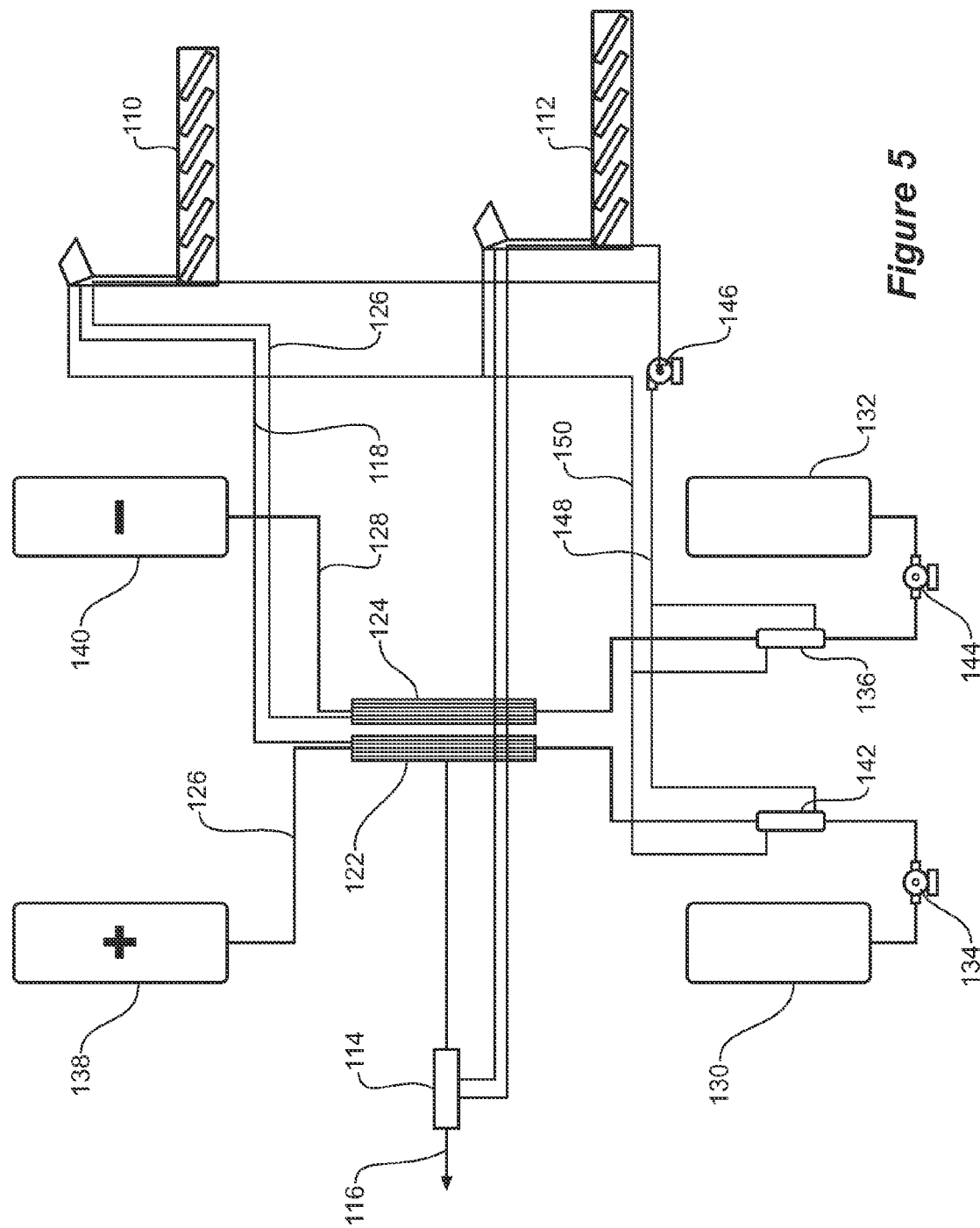
FIG. 5 shows an embodiment of the present invention in which the liquid energy storage system is used in a base load supply of a solar voltaic cell.

FIG. 5 shows the application of the electrical energy storage device of the present invention in a solar voltaic cell installation where the electrical energy storage device allows the solar installation to act as a base load. The system consists of a first solar voltaic cell 110, a second solar voltaic cell 112, the energy storage system of the present invention, and an inverter 114. The second solar voltaic cell 112 supplies power to the load 116 through inverter 114 during daylight hours. At the same time, during daylight hours, the first solar voltaic cell 110 transfers electrical energy through connections 118 and 120 to anode cell 122 and cathode cell 124 while negative 126 and positive 128 electrolyte is pumped from storage reservoirs 130 and 132 via pumps 134 and 136 through the anode 122 and cathode 124 respectively, filling up charge reservoirs 138 and 140 during daylight hours. At night when there is no sunlight, electric power is provided when charge electrolytes in charge reservoirs 138 and 140 are passed through the anode cell 122 and cathode cell 124 to generate electric power that is supplied to the load 116 through inverter 114. The release of the charged electrolyte is controlled to respond to the electrical load 116. Solar voltaic cells generate heat during sunlight operations and this heat may be used to warm up the negative electrolyte through heat exchanger 142 and the positive electrolyte through heat exchanger 144 with pump 146 circulating the hot liquids 148 and 150.

An example duty cycle may be as follows:

First voltaic solar cell 110: Charge 12 hours at 7.5 kW—1 cell

Discharge 12 hours at 7.5 kW—1 cell.

Second voltaic solar cell 112: Supply 7.5 kW for 12 hours.

Figure 6:
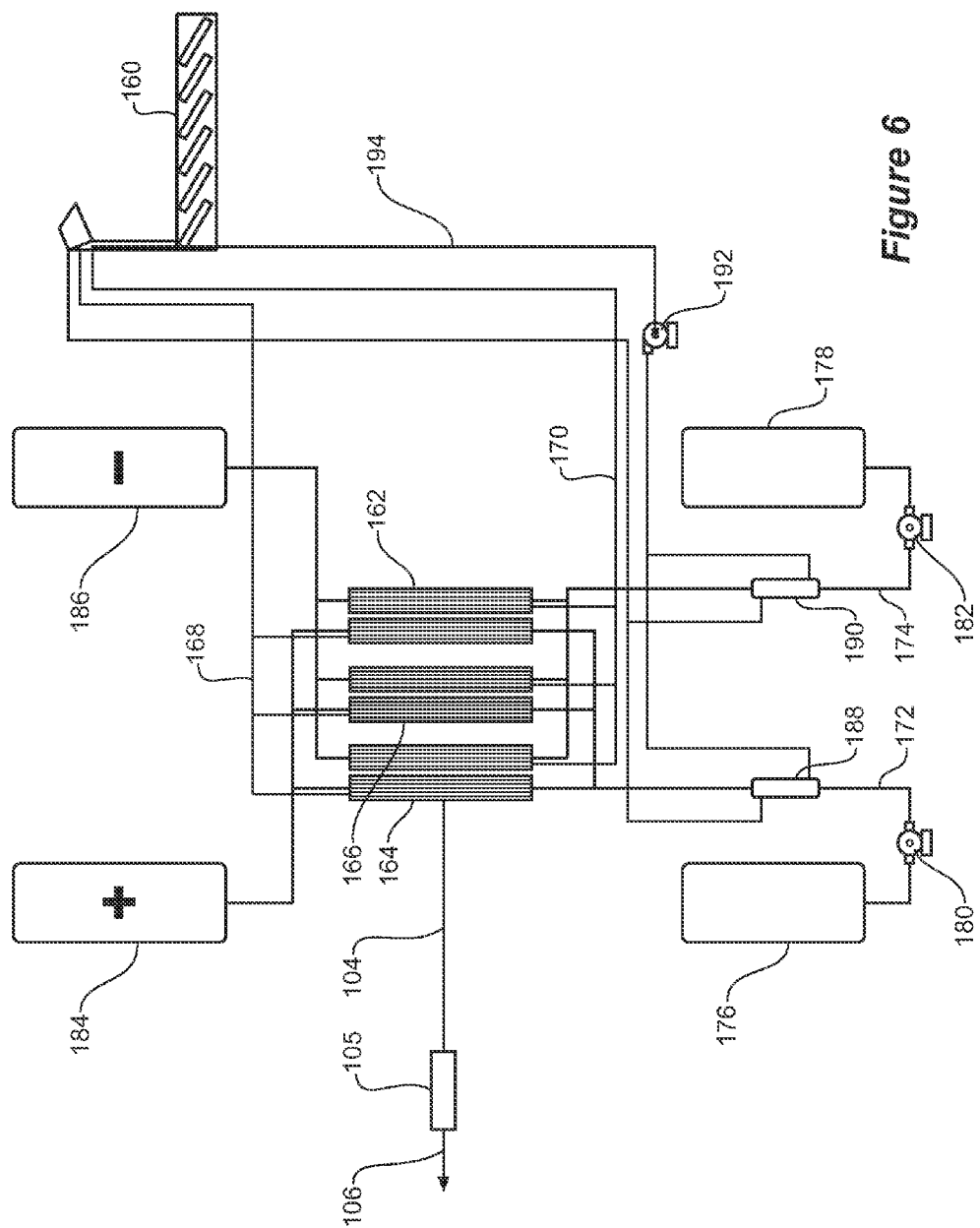
FIG. 6 shows an embodiment of the present invention in which the liquid energy storage system is operating as a peak load supply.

FIG. 6 shows the electrical energy storage device participating in a voltaic solar installation acting to provide peak power to an existing system. The voltaic solar installation charges the electrical energy storage device during 12 hours of sunlight and then the electrical energy storage device discharges its charge supplying power for 2 hours from 6 pm to 8 pm during the evening peak load and then from 6 am to 8 am during the morning peak load. The electrical energy produced by solar voltaic cell 160 during 12 hours of daylight is transmitted to the cells 162, 164 and 166 by connections 168 and 170 while the negative 172 and positive 174 electrolytes are pumped from storage reservoirs 176 and 178 via pumps 180 and 182 through the cells 162, 164 and 166 and the charged electrolytes are stored in charge reservoirs 184 and 186. The solar voltaic cell 160 generates heat during sunlight operations and this heat may be used to warm up the negative electrolyte through heat exchanger 188 and the positive electrolyte through heat exchanger 190 with pump 192 circulating the hot liquid 194. The electric power stored in charge reservoirs 184 and 186 is discharged in 4 hours from 6 to 8 am and 6 to 8 pm during peak demand.

An example duty cycle for volatic solar cell 160 may be as follows:

Charge 12 hours at 7.5 kW—1 cell
Discharge 4 hours at 22.5 kW—3 cells.

Figure 7:
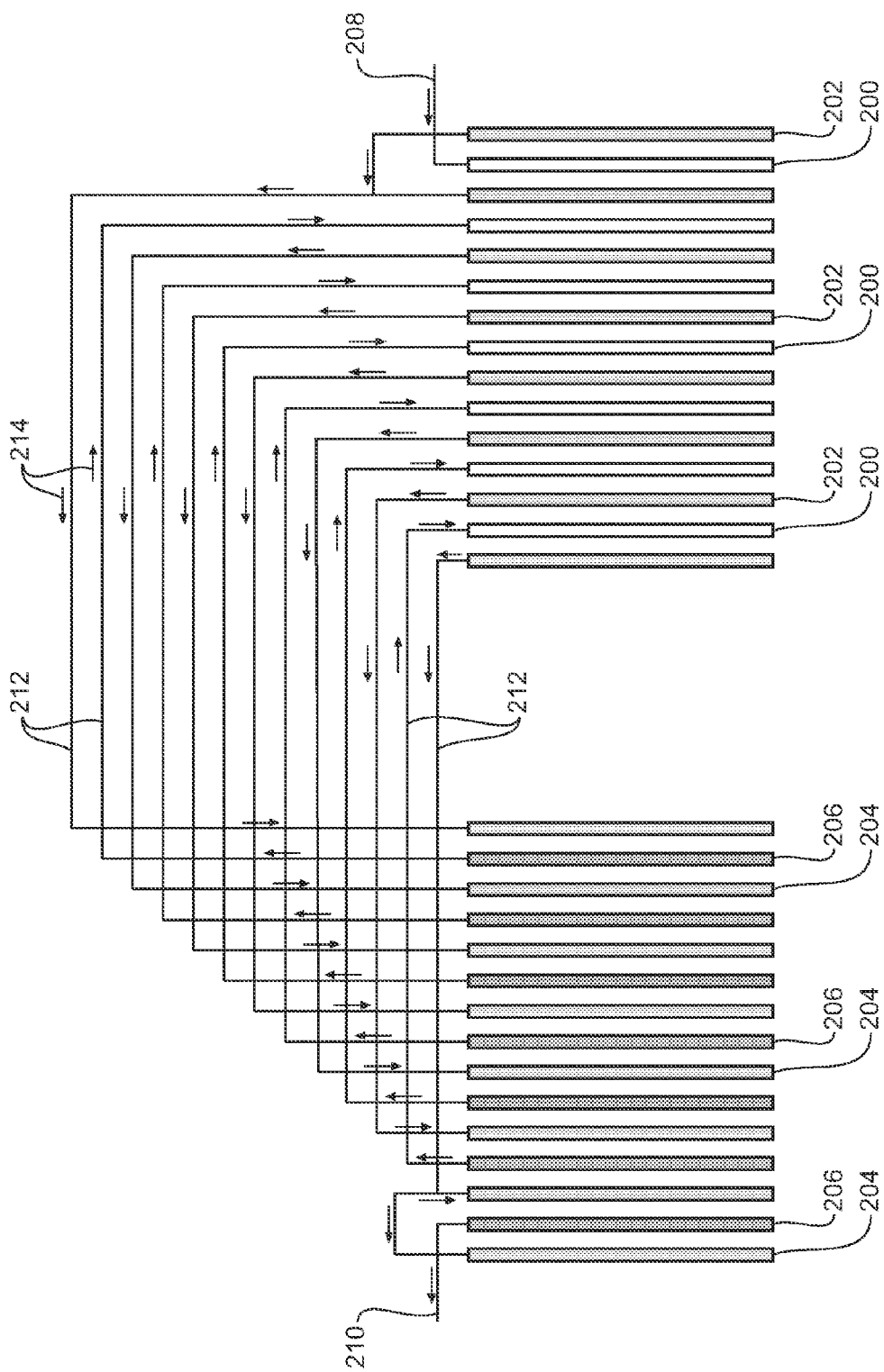
FIG. 7 shows an embodiment of the present invention in which the electrodes of the anode and cathode cells are connected in series to deliver higher voltage.

If necessary, the electrodes in the electrical energy storage device may be connected in series to provide a higher voltage. FIG. 7 shows a series connection of the electrodes of the anode and cathode cells to deliver higher voltage, such as 24 volts. In electrical systems, it is more manageable to operate the electric system at higher voltage and lower current for the same power. The cathode electrodes 200 are matched with solution electrodes 202 are connected to the anode electrodes 204 matched with solution electrodes 206. The negative of the cell is 208 and the positive is 210 with connecting wires 212 and current flow indicated by arrows 214. It may be possible to arrange the electrical connection of the cells so that the voltage during charging is different from the voltage during discharging of the bank of cells. The output of the electrical energy storage device may be changed to a higher AC current through the use of an inverter.

Figure 8:
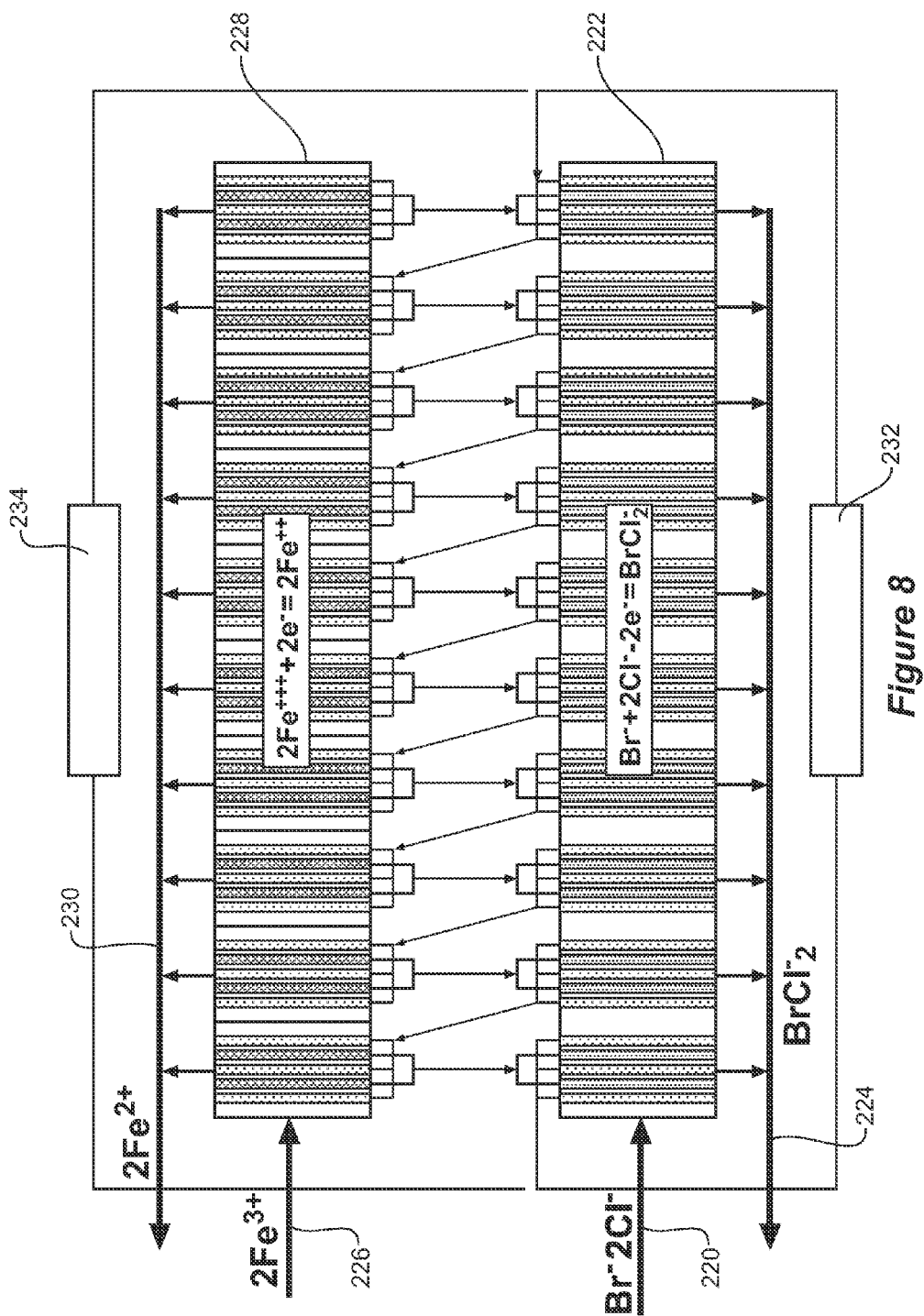
FIG. 8 shows an embodiment of the present invention showing the charging operation of a halide/ferric electrical energy storage device.
Figure 9:
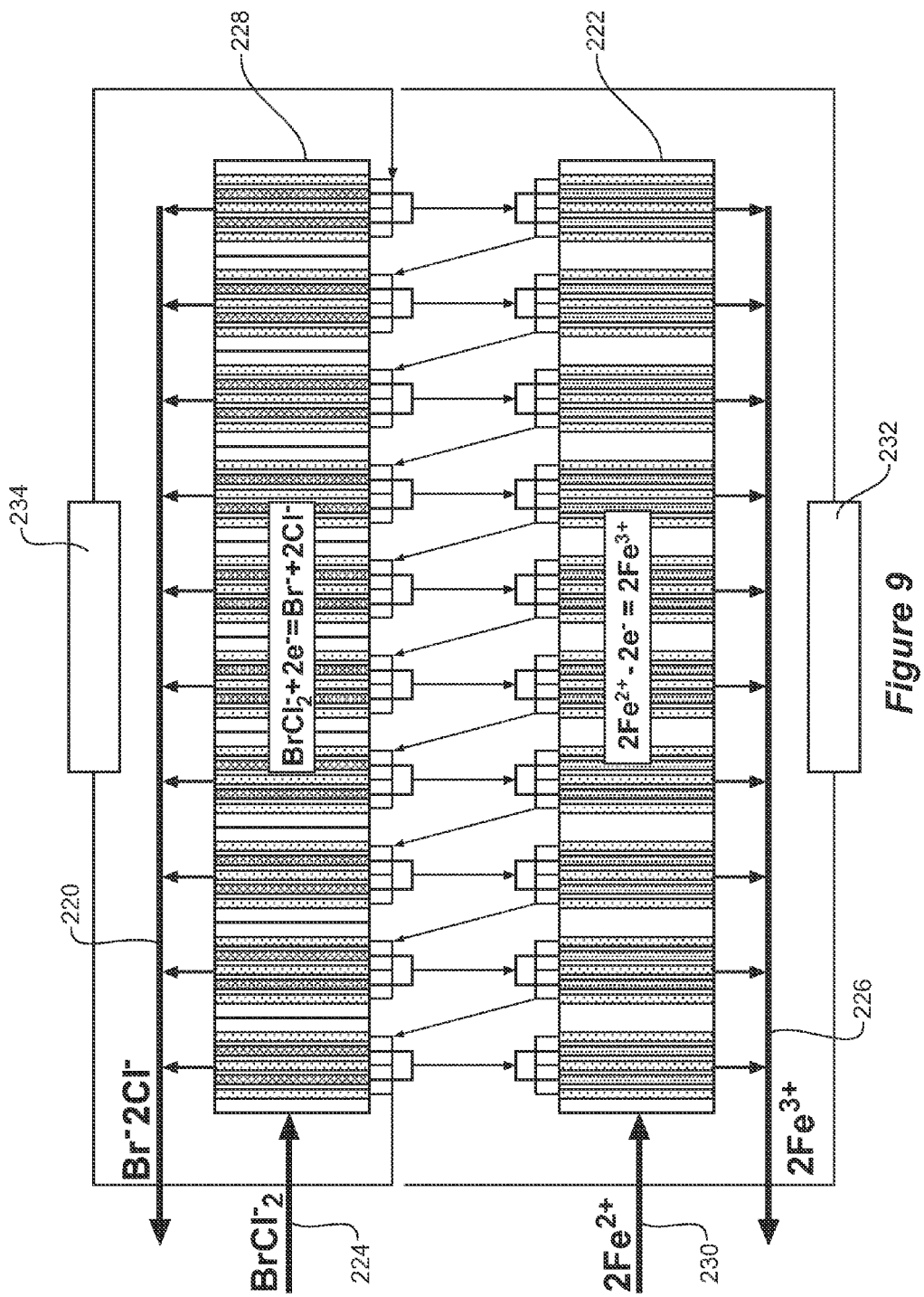
FIG. 9 shows the embodiment of the present invention shown in FIG. 8 in which the electrical energy storage device is in discharging operation.

FIG. 8 shows the charging connections of a halide/ferric electrical energy storage device where the positive electrolyte containing the Fe(3+) ions is fed to the cathode cell where the Fe(3+) ions are reduced to Fe(2+) ions and the negative electrolyte containing the Br(−)2Cl(−) ions is oxidized to BrCl2(−) at the anode cell. Br(−)2Cl(−) 220 is fed into the anode cell 222 where the Br(−)2Cl(−) is oxidized to BrCl2(−) 224 and 2Fe(3+) electrolyte 226 is fed into cathode cell 228 and reduced to 2Fe(2+) 230 by DC power supply 232. The example shows 10 cells of anode 222 and 10 cells of cathodes 228. The discharge cycle of the halide/ferric electrical energy storage device is shown in FIG. 9. 2Fe(2+) is fed to the anode cell 222 where the 2Fe(2+) is oxidized to 2Fe(3+) while the BrCl2(−) is reduced at the cathode cell 228 to Br(−) 2Cl(−) to provide electrical energy to the load 234.

Figure 10:
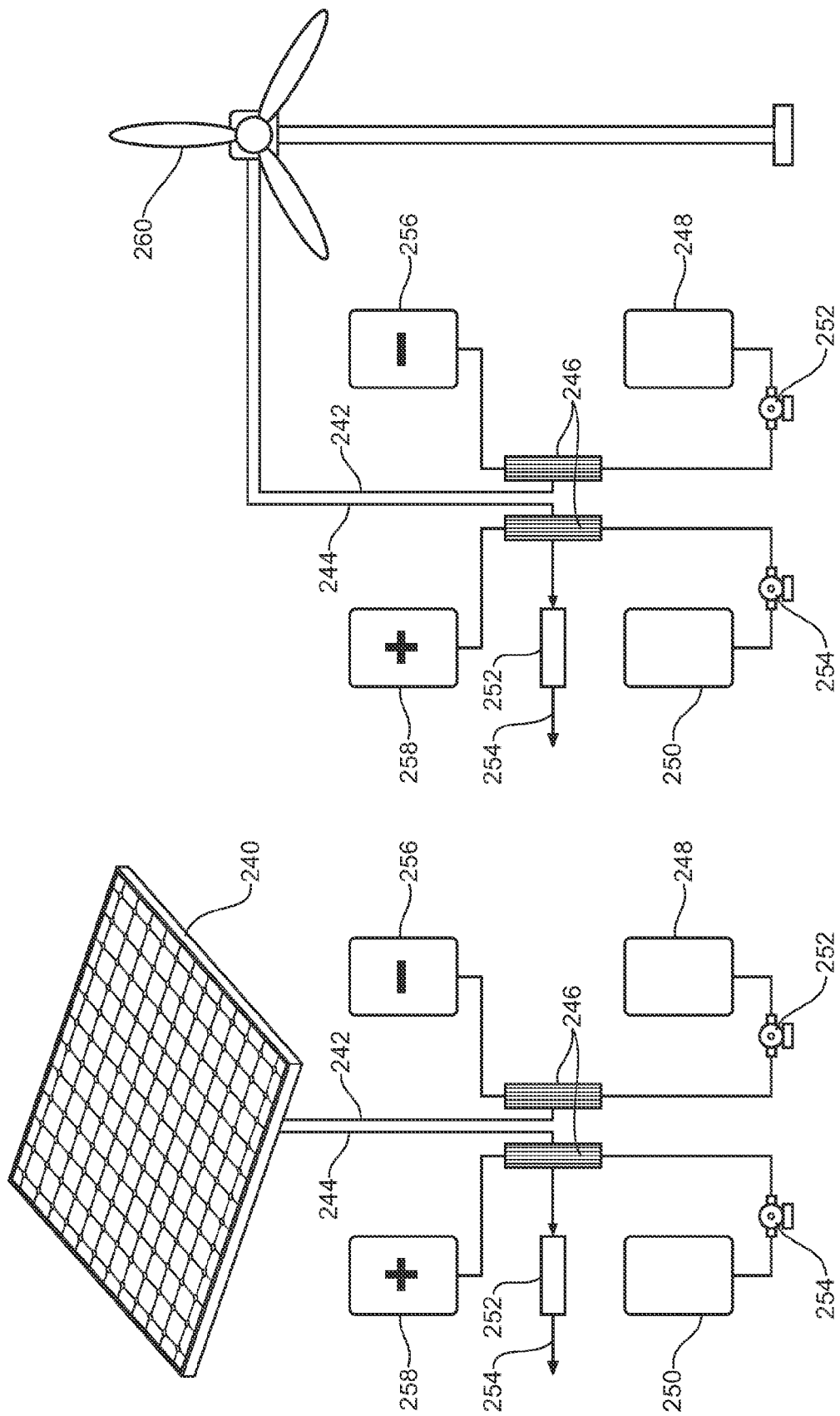
FIG. 10 shows an embodiment of the present invention in which the liquid energy storage system is used in conjunction with renewable solar and wind power.

FIG. 10 shows the application of the electrical energy storage device to a solar power farm (FIG. 10(a)) or a wind power farm (FIG. 10(b)). One large electrical energy storage device or several strategically located electrical energy storage devices could store power for a large solar or wind farm.

In the solar power farm shown in FIG. 10(a), solar panels 240 generate electricity during sunlight and this is passed by connections 242 and 244 to the anode and cathode cells 246 while the negative and positive electrolytes are pumped from storage reservoirs 248 and 250 via pumps 252 and 254 to the charge reservoirs 256 and 258. The stored energy can be released when required through inverter 252 and to the load 254.

For the wind generator, the wind generator 260 supplies energy to the cells 246 when wind is present. As electrolyte is passed through the cells 246, the ions are activated and then stored in charge reservoirs 256 and 258. The electrical energy stored in charge reservoirs 256 and 258 is released when required by the load 254 through inverter 252.

As can be seen, the present invention also provides a process for storing electrical energy generated during an off-peak period for use during a peak period. The process comprises charging the electrical energy storage device according to the present invention using the power generated during the off-peak period, and discharging the stored electrical energy during a peak period.

It will also be seen that the present invention provides a process for storing electrical energy generated by a cyclical energy source for use during a period when the energy source produces little or no electrical energy. The process comprises charging an electrical energy storage device according to the present invention using the power generated by the cyclical energy source, and discharging the stored electrical energy during period when the energy source produces little or no electrical energy.

Figure 11:
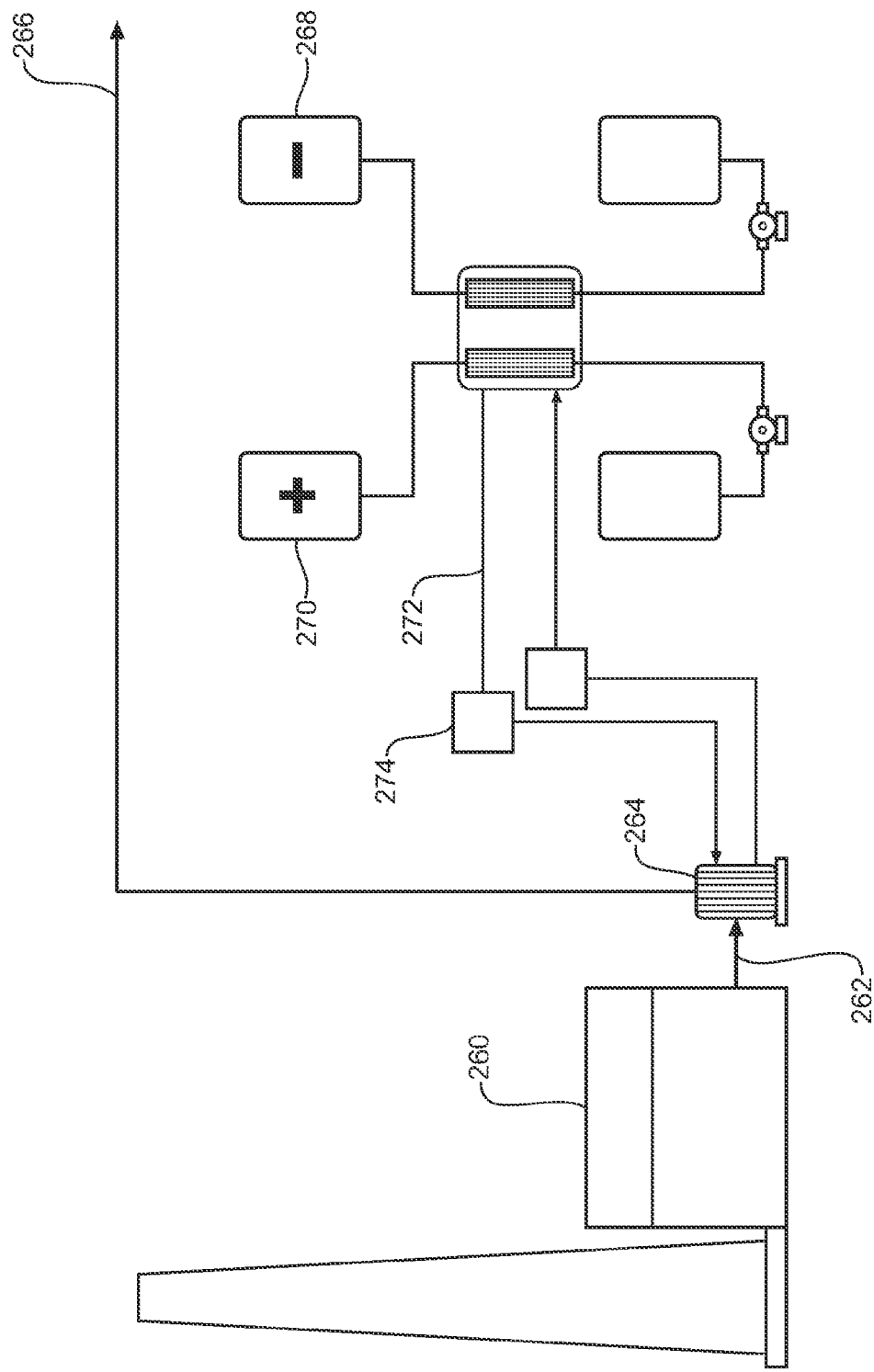
FIG. 11 shows how the liquid energy storage system stores electrical energy during off-peak period of a power plant such as thermal, nuclear, hydro, and geothermal and then releases the energy during peak periods.

FIG. 11 shows the electrical energy storage device storing off-peak power of a thermal, nuclear, hydro or geothermal power plant and then releasing the power during peak periods. This allows flexibility in the power plant operation and also has the effect of increasing the capability of the existing power plant. Power plant 260 which may be a thermal, nuclear, hydro and geothermal generates electric power 262 and passes it through substation 264 to supply the load 266. During off-peak period, power is stored in the charge reservoirs 268 and 270. During peak load demand, power 272 is delivered to the inverter 274 and then to the substation 264 to provide more power for the load 266.

Figure 12:
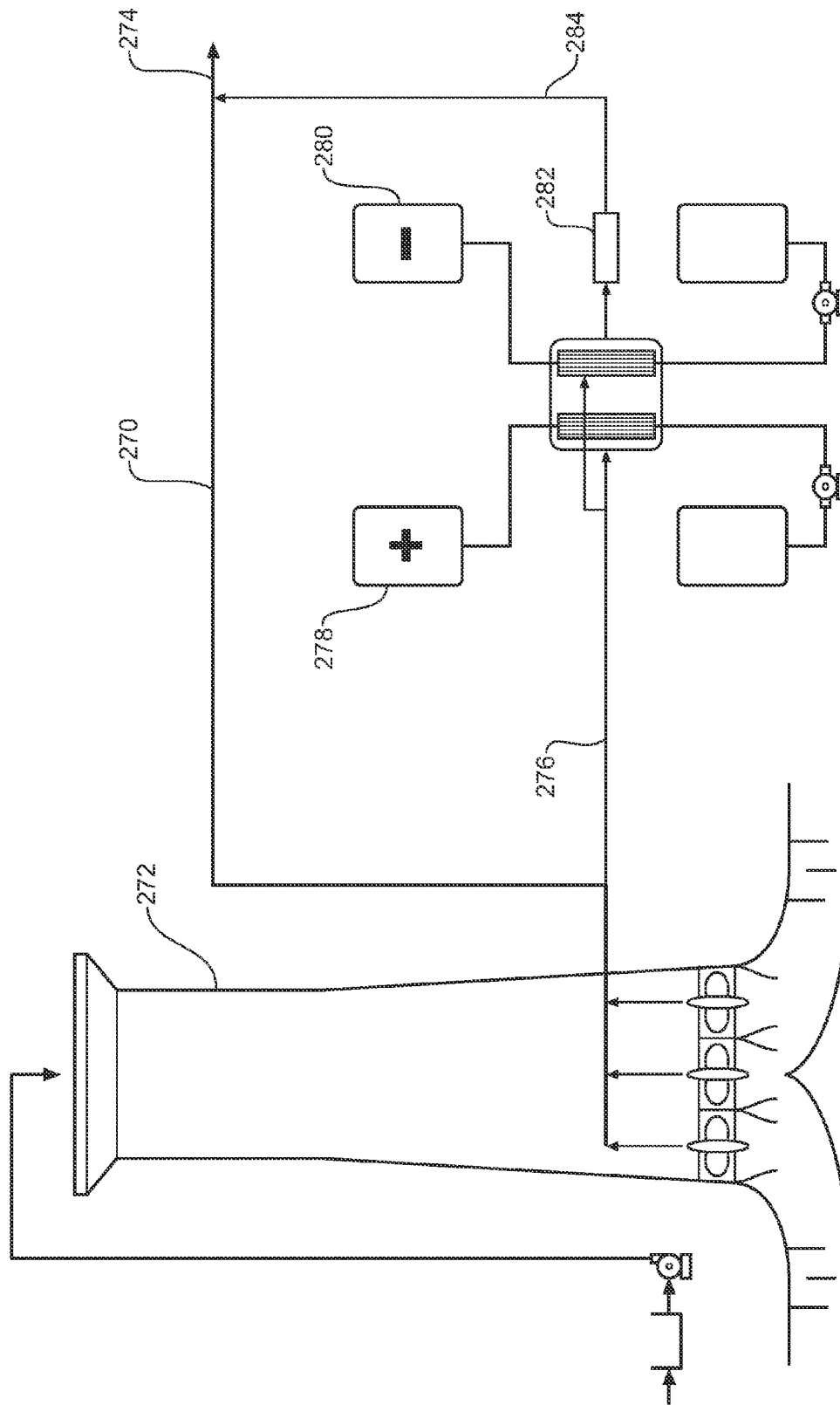
FIG. 12 shows the use of the liquid energy storage system of the present to store peak power of a humidified tower.
Figure 13:
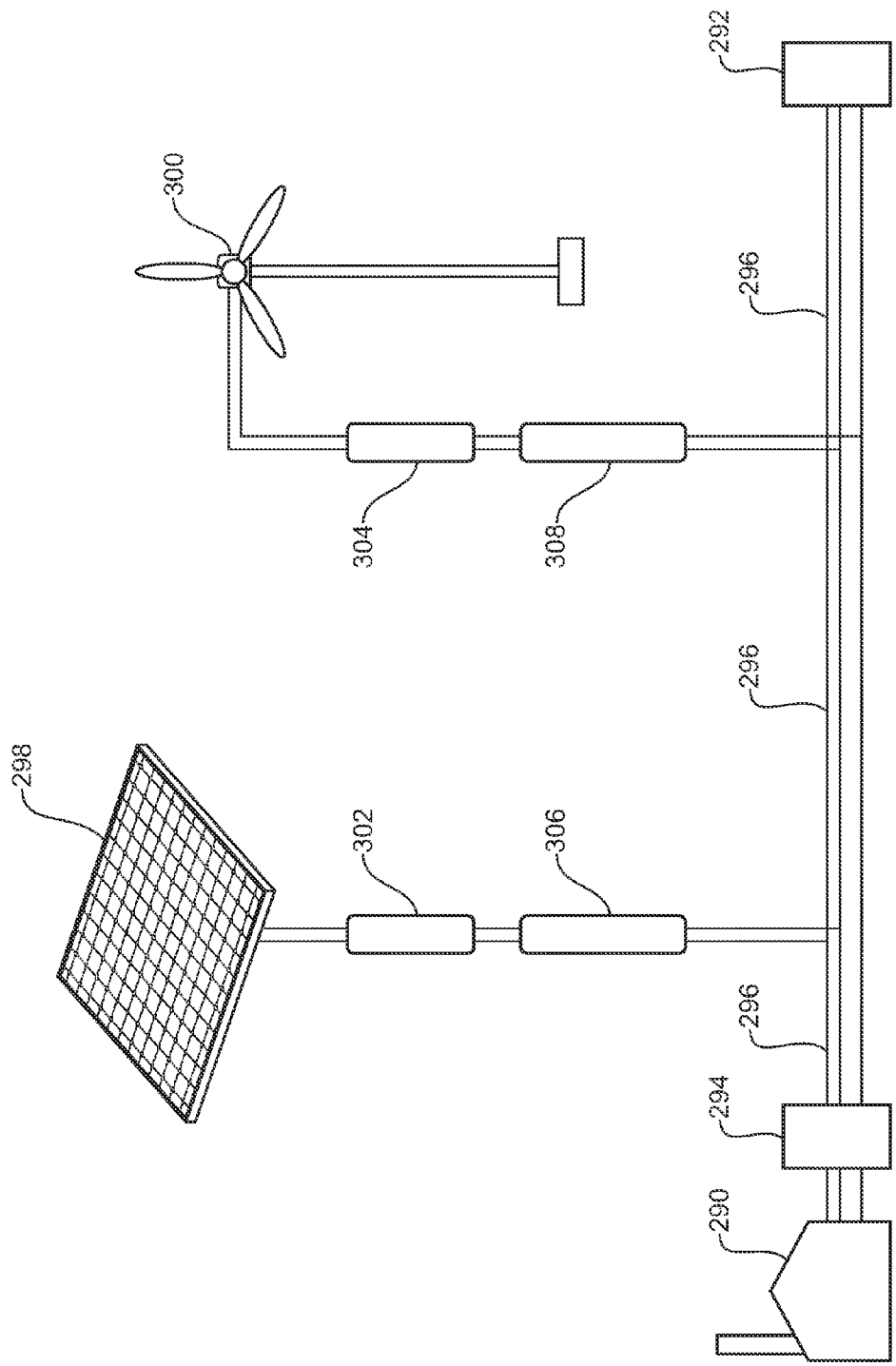
FIG. 13 shows an embodiment of the present invention in which the liquid energy storage system is used to store renewable energy for the grid.

FIG. 12 shows a system for storing peak power generated from a humidified tower. The humidified tower of 400 meters diameter and a height of 1200 meters reaches the atmosphere where the air does not have moisture. Seawater is sprayed at the top of the tower which is absorbed by the air which drops because it is heavy with the water absorbed and the lower temperature. As the heavy cold air drops, it reaches speed of 60 to 80 km/h at the bottom of the tower where wind generators produce electricity of about 600 megawatts; however, about half is used for pumping the seawater to the top of the tower. The humidified tower produces less power during the night and there are differences in the power produced during summer and during winter. Therefore, it is useful to have an energy storage system for the humidified tower. As shown in FIG. 12, electricity 270 that is produced by the humidified tower 272 is delivered to the load 274. However, some of the electricity 276 is also stored in the charge reservoirs 278 and 280 as described previously. When additional electricity is required, the electricity is released through inverter 282 and then delivered to the load 274 via conduit 284.

A common practice is to connect solar or wind power to existing grids. The renewable power is not effective as the wind or solar power may be fed when the grid does not require it. In any event, the thermal power plant operator who buys the renewable energy, still needs to provide reliable back-up power to meet the needs of its clients. It is possible that contrary to expectation, the more renewable power is added to a grid, the higher the cost of electricity to the clients. This situation is depicted in FIG. 14. The solution is to provide energy storage so that the renewable energy can be delivered to the grid when required rather than when produced. This allows for the proper operation of the grid and a lower electricity price, with less carbon dioxide produced.

As shown in FIG. 14, power plants 290 supply electricity to the load 292 through substation 294 and the grid 296. If cyclic energy such as solar 298 and wind 300 is supplied to the grid 296, the renewable supply may not match the load requirements of the grid 296. The grid 296 can take so much only of the renewable cyclic energy before it affects the supply-load characteristics of the grid. The value of the renewable energy connected to the grid 296 is improved substantially if the energy is stored in an electrical energy storage device according to the present invention 302 for the solar and 304 for the wind generators and fed to the grid 296 through inverters 306 or 308.

In other embodiments, an electrical energy storage device according to the present invention may be used to supply electrical energy to electric transport vehicles. The electric vehicle may be fitted with charged electrolyte tank and the discharged electrolyte tank that are designed so that the weight profile of the electric vehicle does not change as charged electrolyte is passed through the electrolytic cells to generate power for the electric motors that may be fitted to 2 or 4 wheels. In operation, the discharged electrolyte may either be re-charged in the electric vehicle or the discharged electrolyte may be dropped into an electrical station and the charged electrolyte may be loaded into the charged electrolyte tank of the electric vehicle from the electrical station. The electrical station may draw its electric power from the mains or from renewable electric energy such as solar, wind, wave, hydro or geothermal located in strategic places convenient to motorists.

The electrical energy storage device described herein offers a higher efficiency, a higher capacity, and longer life than a battery based on a diaphragm or membrane electrolytic cell.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. An electrical energy storage device comprising an anode cell and a cathode cell, the anode cell comprising an anode electrode and an anode solution electrode and the cathode cell comprising a cathode electrode and a cathode solution electrode, an electrical connection between the anode electrode and the cathode electrode, the electrical connection comprising a DC power source connection and an electrical load connection, a direct electrical connection between the anode solution electrode and the cathode solution electrode, the anode cell containing an anodic reversible redox couple electrolyte comprising ions capable of being oxidised in the anode cell during a charging cycle to form higher oxidation state ions which are capable of being reduced in the anode cell during a discharge cycle, and the cathode cell containing a cathodic reversible redox couple electrolyte comprising ions capable of being reduced in the cathode cell during a charging cycle to form lower oxidation state ions which are capable of being oxidized in the cathode cell during a discharge cycle.

2. The electrical energy storage device according to claim 1, comprising an anodic redox couple electrolyte supply comprising a charge reservoir and a storage reservoir, each reservoir being in fluid communication with the anode cell, and a cathodic redox couple electrolyte supply to the cathode cell, the cathodic redox couple electrolyte supply comprising a charge reservoir and a storage reservoir, each reservoir being in fluid communication with the cathode cell.

3. The electrical energy storage device according to claim 1, wherein the anodic reversible redox couple electrolyte is a polyhalide-halide redox couple.

4. The electrical energy storage device according to claim 1, wherein the cathodic reversible redox couple electrolyte is an inorganic acid containing ions selected from iron, vanadium, cerium, and chromium.

5. The electrical energy storage device according to claim 4, wherein the cathodic reversible redox couple electrolyte is a V(II)-V(III) redox couple.

6. The electrical energy storage device according to claim 1, wherein the anode, cathode and solution electrodes in the anode cell and cathode cell are connected in series to produce a higher cell voltage.

7. The electrical energy storage device according to claim 1, wherein the anode, cathode and solution electrodes are coated with a catalyst made from a metal or a metal compound selected from platinum, ruthenium, iridium, cobalt, nickel, rare earth elements, and titanium.

8. The electrical energy storage device according to claim 1, wherein two or more anode cells are connected in series with two or more cathode cells to achieve a higher voltage.

9. An electrical storage system comprising an electricity generator in electrical connection with an electrical energy storage device according to claim 1.

10. The electrical storage system according to claim 9, wherein the electricity generator is a renewable electric energy source and the electrical energy storage device is used to store excess power and release the power when required.

11. The electrical storage system according to claim 9, wherein the electricity generator is a thermal, nuclear, hydro, geothermal or solar energy source and the electrical energy storage device is used to store off-peak power and release it during peak power demands.

12. An electric vehicle comprising the electrical energy storage device of claim 1.

13. A process for storing electrical energy generated during an off-peak period for use during a peak period, the process comprising charging the electrical energy storage device of claim 1 using the power generated during the off-peak period, and discharging the stored electrical energy during a peak period.

14. A process for storing electrical energy generated by a cyclical energy source for use during a period when the energy source produces little or no electrical energy, the process comprising charging the electrical energy storage device of claim 1 using the power generated by the cyclical energy source, and discharging the stored electrical energy during period when the energy source produces little or no electrical energy.

15. A process for producing electricity, the process comprising applying an electrical load to the electrical load connection of the electrical energy storage device of claim 2, wherein the charge reservoir of the anodic redox couple electrolyte supply contains anodic reversible redox couple electrolyte ions in the higher oxidation state, and the charge reservoir of the cathodic redox couple electrolyte supply contains cathodic reversible redox couple electrolyte ions in the lower oxidation state.

16. The electrical energy storage device according to claim 2, wherein the anodic reversible redox couple electrolyte is a polyhalide-halide redox couple.

17. The electrical energy storage device according to claim 2, wherein the cathodic reversible redox couple electrolyte is an inorganic acid containing ions selected from iron, vanadium, cerium, and chromium.

18. The electrical energy storage device according to claim 3, wherein the cathodic reversible redox couple electrolyte is an inorganic acid containing ions selected from iron, vanadium, cerium, and chromium.

19. The electrical energy storage device according to claim 16, wherein the cathodic reversible redox couple electrolyte is an inorganic acid containing ions selected from iron, vanadium, cerium, and chromium.

* * * * *